United States Patent [19]

Walker

[11] 4,113,075
[45] Sep. 12, 1978

[54] CENTRIFUGAL LOCK-UP CLUTCH AND TORQUE CONVERTER

[75] Inventor: Frank H. Walker, Grand Blanc, Mich.

[73] Assignee: General Motors Corporation, Detroit, Mich.

[21] Appl. No.: 798,768

[22] Filed: May 20, 1977

[51] Int. Cl.$^2$ .................. F16H 41/18; F16D 43/14
[52] U.S. Cl. .................. 192/3.31; 192/103 B; 192/55
[58] Field of Search .................. 192/3.31, 3.3, 3.29, 192/103 B, 105 BA, 55

[56] References Cited

U.S. PATENT DOCUMENTS

| 2,235,673 | 3/1941 | Dodge | 192/3.31 |
| 3,081,856 | 3/1963 | Wolfram | 192/55 X |
| 4,029,187 | 6/1977 | Davis et al. | 192/105 BA |
| 4,049,094 | 9/1977 | Polomski et al. | 192/3.31 |

*Primary Examiner*—Benjamin W. Wyche
*Attorney, Agent, or Firm*—Donald F. Scherer

[57] ABSTRACT

A lock-up clutch for a torque converter wherein the clutch is engaged with the impeller by centrifugal force. The clutch is drive connected to the turbine through a primary drive spring, disposed in a circumferential direction, so that relative angular movement initiated by engine torsional vibrations occur between the clutch and turbine. A secondary clutch engagement control spring is connected in a generally radial direction between the clutch and turbine. The secondary spring provides a clutch holdoff force at low clutch speeds and a clutch engagement intensifier force after engagement. A friction member is disposed between the clutch and the turbine to dampen the engine torsional vibrations.

2 Claims, 7 Drawing Figures

CENTRIFUGAL LOCK-UP CLUTCH AND TORQUE CONVERTER

This invention relates to lock-up clutches and more particularly to centrifugally actuated lock-up clutches.

It is an object of this invention to provide an improved centrifugally actuated lock-up clutch for a torque converter having a drive spring disposed in a circumferential direction between the turbine and a clutch shoe and an engagement control spring disposed in a radial direction between the clutch shoe and the turbine.

Another object of this invention is to provide an improved lock-up clutch for a torque converter wherein the clutch is centrifugally engaged with the impeller in a radial direction and is resiliently drivingly connected to the turbine in a circumferential direction and wherein engagement control springs are connected between the clutch and the turbine in a radial direction so as to disengage the clutch at low speed and intensify clutch engagement at high speeds.

Figure 4:
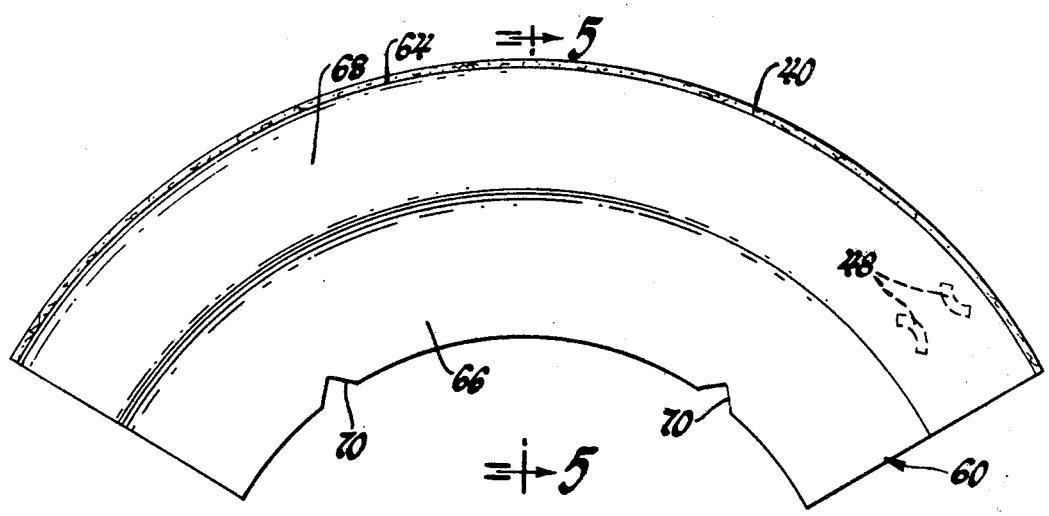
Figure 5:
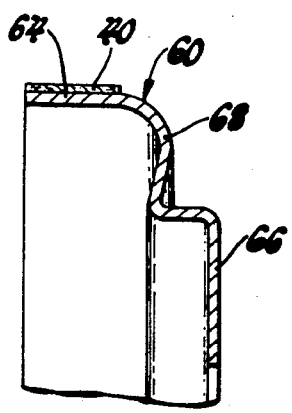
Figure 6:
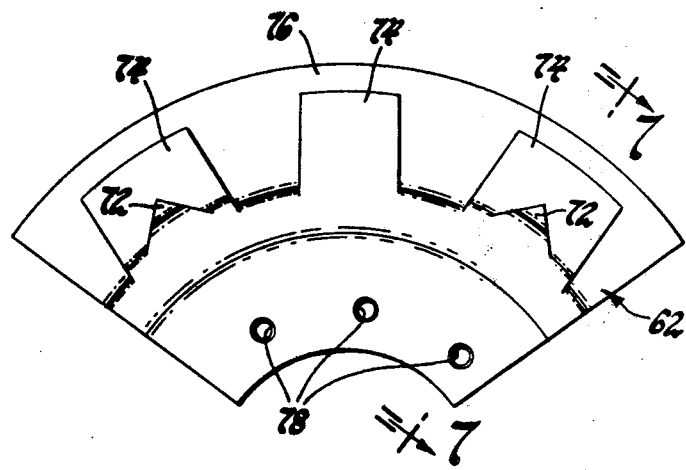
Figure 7:
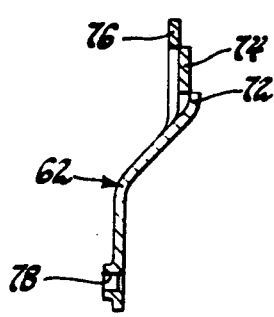

These and other objects and advantages of the present invention will be more apparent from the following description and drawings in which:

Figures 1, 2, 3:
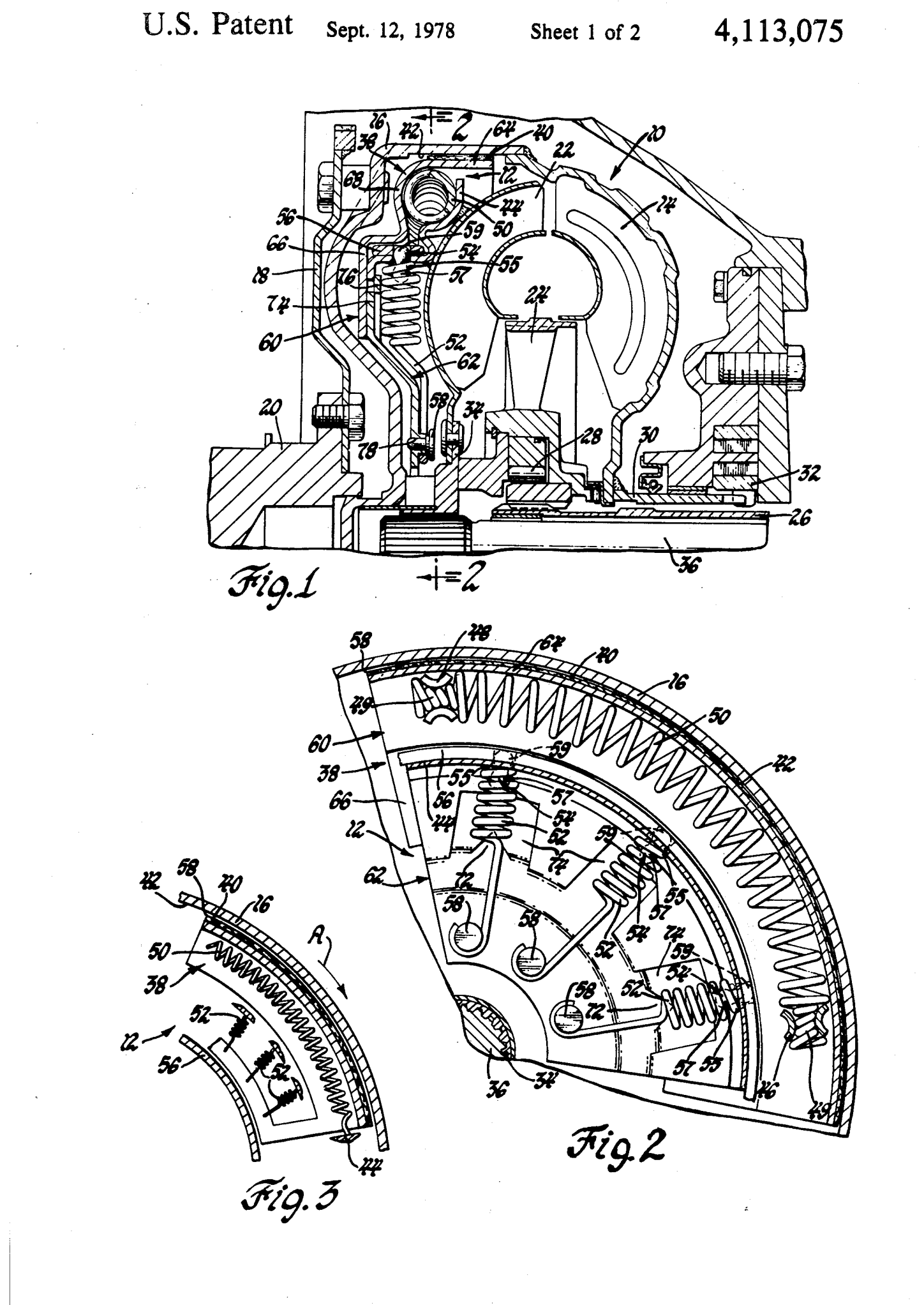

FIG. 1 is a cross sectional side view;
FIG. 2 is a view taken along line 2—2 in FIG. 1;
FIG. 3 is a schematic representation of a clutch shoe and spring;
FIG. 4 is an elevational view of a portion of the clutch shoe;
FIG. 5 is a view taken along line 5—5 in FIG. 4;
FIG. 6 is an elevational view of another portion of the clutch shoe; and
FIG. 7 is a view taken along line 7—7 in FIG. 6.

Referring to the drawings there is shown in FIG. 1 a drive system comprised of a torque converter, generally designated 10, and a lock-up clutch, generally designated 12. The torque converter includes an impeller 14 which is secured to an input shell 16 which in turn is fastened to a conventional flex plate 18 bolted to an engine crankshaft 20. The impeller 14 is in fluid communication with a turbine 22 in a conventional manner. A stator member 24 is also included in the torque converter. The stator is connected to the transmission housing in a conventional manner through a shaft 26 and a conventional one-way brake 28. The impeller 14 is connected to a pump shaft 30 which drives a conventional internal-external type gear pump 32.

The turbine 22 is riveted or otherwise secured to a turbine hub 34 which is splined to a transmission shaft 36. The shaft 36 may be connected to any of the well known conventional planetary gear type transmissions or to any of the well known multi-step transmissions. Disposed between the turbine 22 and the input shell 16 is the clutch 12 which is centrifugally responsive. The clutch 12 consists of a plurality of clutch shoes 38 which have secured thereto a friction facing 40 adapted to frictionally engage an inner circumferential surface 42 of the input shell 16. A spring anchor member 44 is welded or otherwise secured to the turbine 22 and has formed thereon a spring attaching member 46 shown in FIG. 2. Also shown in FIG. 2 is a spring attaching member 48 which is similar to member 46 and is secured to the clutch shoe 38. The spring attaching members 46 and 48 are hour-glass shaped to retain reduced coil sections 49 of a coil spring 50, thereby interconnecting the turbine 22 and the clutch shoe 38.

The spring 50 is capable of deflecting to permit relative motion between the turbine 22 and clutch shoe 38 either in compression or tension, while at the same time transmitting drive forces or torque between the clutch shoe 38 and the turbine 22. A plurality of radially disposed secondary springs 52 are connected between a radial inner portion of clutch shoe 38 and the spring anchor member 44. The springs 52 are secured to the spring anchor 44 by a connector 54 having a radially inner spherical end 57 held within a reduced coil 55 of the spring 52 and a radially outer spherical end 59 held in an aperture formed in the spring anchor 44. The outer spherical end 59 of member 54 also is disposed in an aperture in a friction facing 56. Thus the friction facing 56 is drivingly connected to the spring anchor 44 and, therefore, turbine 22 through the member 54. The inner end of spring 52 is secured by a rivet or other fastener 58 to the radially inner surface of clutch shoe 38.

The number of clutch shoes 38 to be utilized with a given torque converter can vary. It is contemplated that either three clutch shoes encompassing an arc of approximately 120° each or four clutch shoes encompassing an arc of approximately 90° each will be utilized. One such clutch shoe is shown schematically in FIG. 3. This figure will be used for description of the operation of the clutch. The same numerical designations will be given to the components of FIG. 3 as were given to the components of FIGS. 1 and 2. For simplicity in FIG. 3 the friction member 56 is shown radially inward of the clutch shoe 38.

Assuming the input shell 16 is being driven by the engine, in the direction of arrow A, causing rotation of the impeller 14, and if the shaft 36 is permitted to rotate, the turbine 22 will rotate. The clutch shoe 38 will be driven with the turbine 22 through spring 50 while the friction surface 40 is held inwardly out of engagment with surface 42 at low turbine speeds by the radially disposed springs 52. These springs are compressed between the spring anchor 44 and the clutch shoe 38. However, as the speed of the turbine increases, the clutch shoe 38 will move outwardly due to the centrifugal force thereon against the force in springs 52. At a predetermined speed of rotation of the turbine 22, the friction surface 40 will engage the friction surface 42 thereby causing a frictional drive connection between the clutch shoe 38 and the input shell 16. The drive will be transmitted through the coil spring 50 to the turbine 22 and hence to the transmission shaft 36. Since the input shell 16 is driven in the direction of arrow A, the clutch shoe 38 will be driven in a direction of arrow A thereby compressing spring 50 due to the torque transmitted from the clutch shoe 38 to the turbine 22.

The clutch shoe 38 will move, in a rotational direction, relative to the turbine 22 such that the springs 52 will tend to lengthen thereby reducing the hold off force that had been present. After sufficient relative motion between the turbine 22 and clutch 12 and clutch shoe 38, the springs 52 will have a tension force imposed thereon. This tension force in springs 52 will be transmitted to the clutch shoe 38 in such a manner that the trailing edge 58 of clutch shoe 38 will have an additional engagement force applied thereto reducing the likelihood of clutch chatter. As is well known with internal combustion engines, there is a torsional vibration transmitted. The coil spring 50 permits the input shell and the clutch shoe 38 to respond to the engine torsionals by moving relative to the turbine 22. The friction surface 56 is responsive to the speed of rotation of the turbine 22 in such a manner that it will frictionally engage the clutch shoe 38 to provide a frictional drive connection between the clutch shoe 38 and the turbine 22. This friction surface 56 is designed to transmit approximately 10% of the torque transmitted by the clutch shoe 38. This low torque transmission to friction surface 56 is present to dampen the energy associated with the engine torsional vibrations. The need for energy dampening is well known in lock-up type clutches. However, in prior art type devices this frictional energy dampening has been provided by disk type friction surfaces which are spring loaded between the input and the output sides of the clutch damper rather than being circumferentially disposed and responsive to the centrifugal force imposed by the clutch speed.

Should the operator release the accelerator pedal thereby placing the vehicle in a coasting condition, the clutch shoe 38 will remain engaged. However, during this time the drive is reversed through the clutch such that the drive originates at the turbine 22 and is transmitted through the spring 50 to the clutch shoe 38 and thence to the engine under a condition known as "engine braking". Under this condition, the turbine is attempting to overrun the clutch shoe 38 and therefore the spring 50 is loaded in tension. This change in direction of torque transmission also changes the force on the secondary springs 52 such that the intensifier force at the trailing edge is relieved and the springs 52 begin assumed compression loading such that the clutch 12 will be disengaged if the speed of the turbine is reduced sufficiently.

The clutch shoe 38 is preferably formed of two sheet metal pieces one being an outer member 60 shown in FIGS. 4 and 5 and the other being an inner member 62 shown in FIG. 6 and 7. The outer member 60 has a circumferential surface 64 and a radial surface 66. These surfaces 64 and 66 are connected by a curved surface 68 which has a radius of curvature slightly larger than that of the coil spring 50 such that the spring 50 is partially surrounded or enclosed by the outer member 60. The radial surface 66 has a pair of notches 70 formed therein. These notches 70 are aligned with projections 72 formed on the inner member 62.

The outer member 62 is formed from a substantially arcuate shaped piece of sheet metal which is expanded axially to form the projection 72, spacer tabs 74 which are substantially rectangular in shape, and an annular surface 76. The spacer tabs 74 are formed to permit the spring anchor 44 to be positioned between the surface 76 and the radial portion 66 of outer member 60. The inner member 62 has three apertures 78 which are offset from the central axis of the arcuate inner member 62 such that the proper spring offset for spring 52 will be present for the intensifier force applied to the trailing edge of the clutch shoe 38 after engagement thereof. The springs 52 as mentioned earlier are riveted or otherwise secured to the clutch shoe 38 at the position of these apertures 78. The outer member 60 and inner member 62 may be secured together by any known fashion.

Obviously, many modifications and variations of the present invention are possible in light of the above teaching. It is therefore to be understood, that within the scope of the appended claims the invention may be practiced otherwise than as specifically described.

What is claimed is:

1. A centrifugal lock-up clutch and torque converter comprising; torque receiving input means including an input shell and a fluid impeller; torque delivery output means including a fluid turbine; clutch shoe means having leading and trailing edges disposed between said turbine and said input shell and being operable to frictionally engage said input shell in response to centrifugal forces thereon; drive spring means drivingly connected in a generally circumferential direction between said clutch shoe means and said turbine and being effective to transmit rotation to said clutch shoe means from said turbine prior to engagement and being resiliently effective to transmit drive torque from said input shell to said turbine after engagement of said clutch shoe means while permitting relative angular movement between the clutch shoe means and said turbine due to compression of said drive spring means while said clutch shoe means is engaged; clutch engagment control spring means operatively connected in a generally radial direction between said clutch shoe means and said turbine and applying a force therebetween resiliently resisting movement of said clutch shoes radially toward said input shell until the clutch shoe means frictionally engages the input shell and relative angular movement in the direction of input shell rotation between the clutch means and turbine occurs, the relative angular movement resulting in a reversal of force in said clutch engagement control spring means so as to increase the engagement force at the trailing edge of the clutch shoe means; and energy dissipating friction means operatively connected between the clutch shoe means and the turbine to dampen torsional vibrations.

2. A centrifugal lock-up clutch and torque converter comprising; input means driven by a prime mover; said input means including an input shell having an inner circumferential surface and a fluid impeller; output means including a fluid turbine member driven by said impeller; a plurality of clutch shoes disposed between said turbine and input shell each shoe having an outer circumferential surface adjacent said inner circumferential surface and being adapted to frictionally engage said inner circumferential shell surface; primary spring means disposed in a circumferential direction and connected between said turbine and each of said clutch shoes for providing a flexible drive connection therebetween; secondary spring means disposed radially between said turbine and each of said clutch shoes to urge said clutch shoes radially inwardly; said clutch shoes being centrifugally responsive to move radially outward against a compression force in said secondary spring means to frictionally engage said input means when the speed of said turbine exceeds a predetermined value, said primary spring means being compressed to permit relative angular movement between the clutch shoe and said turbine to accommodate torsional vibrations imposed on said input shell by the prime mover and the force in said secondary spring means changing from compression to tension as the clutch shoe is moved relative to said turbine and driven by the input shell; and centrifugally actuated friction means rotatable with said turbine and movable radially into engagement with said clutch shoes to dampen the torsional vibrations.

* * * * *